United States Patent [19]
Vachon et al.

[11] Patent Number: 6,105,350
[45] Date of Patent: Aug. 22, 2000

[54] MULTI-PORT HOPPER EXHAUST APPARATUS

[75] Inventors: Bertrand Vachon, Thetford Mings, Canada; Jay J. Kakuk, Plymouth, Minn.

[73] Assignee: The Toro Company, Bloomington, Minn.

[21] Appl. No.: 09/141,806

[22] Filed: Aug. 28, 1998

[51] Int. Cl.$^7$ .................................................. A01D 43/00
[52] U.S. Cl. ............................................. 56/202; 56/16.6
[58] Field of Search ..................... 56/202, 16.6, 12.9

[56] References Cited

U.S. PATENT DOCUMENTS

| | | | |
|---|---|---|---|
| D. 413,125 | 8/1999 | Vachon et al. | D15/17 |
| 3,708,968 | 1/1973 | Enters et al. | 56/16.5 |
| 3,710,412 | 1/1973 | Hollowell | 15/340 |
| 3,716,977 | 2/1973 | Jackson | 56/202 |
| 3,722,192 | 3/1973 | Corbett | 56/202 |
| 3,838,558 | 10/1974 | Goodchild | 56/12.8 |
| 3,974,631 | 8/1976 | Rhodes | 56/202 |
| 3,987,606 | 10/1976 | Evans | 56/13.4 |
| 4,043,100 | 8/1977 | Aumann et al. | 56/16.5 |
| 4,095,398 | 6/1978 | Aumann et al. | 56/202 |
| 4,104,852 | 8/1978 | Tackett | 56/202 |
| 4,244,164 | 1/1981 | Szymanis | 56/202 |
| 4,310,998 | 1/1982 | Cuba | 56/202 |
| 4,426,830 | 1/1984 | Tackett | 56/202 |
| 4,433,532 | 2/1984 | McCunn | 56/320.2 |
| 4,535,501 | 8/1985 | Hollowell et al. | 15/339 |
| 4,589,249 | 5/1986 | Walker et al. | 56/16.6 |
| 4,614,080 | 9/1986 | Hoepfner et al. | 56/16.6 |
| 4,631,909 | 12/1986 | McLane | 56/202 |
| 4,745,735 | 5/1988 | Katayama | 56/202 |
| 4,819,417 | 4/1989 | Bryant et al. | 56/202 |
| 4,868,948 | 9/1989 | Arnold | 15/340.1 |
| 4,922,696 | 5/1990 | Burns et al. | 56/202 |
| 4,924,664 | 5/1990 | Hicks et al. | 56/202 |
| 4,964,266 | 10/1990 | Kolb | 56/202 |
| 4,969,320 | 11/1990 | Langford | 56/16.6 |
| 5,033,260 | 7/1991 | Jerry | 56/202 |
| 5,058,235 | 10/1991 | Charky | 15/340.1 |
| 5,107,566 | 4/1992 | Schmid | 15/338 |
| 5,195,310 | 3/1993 | Kettler et al. | 56/202 |
| 5,307,613 | 5/1994 | Delery | 56/202 |
| 5,321,939 | 6/1994 | Fuse et al. | 56/10.2 |
| 5,425,223 | 6/1995 | DeLaRonde | 56/10.2 |
| 5,457,946 | 10/1995 | Deitrick | 56/16.6 |
| 5,517,811 | 5/1996 | Schaedler et al. | 56/202 |
| 5,605,033 | 2/1997 | Olmr | 56/10.2 |
| 5,735,018 | 4/1998 | Gallagher et al. | 15/405 |
| 5,875,620 | 3/1999 | Goeke et al. | 56/13.4 |

OTHER PUBLICATIONS

Yard & Garden Tractors Rear–Engine Riders, TORO Wheel Horse Tractors & Riding Mowes, 1994 (5 pages).

Lawn and Garden Tractors, TORO Wheel Horse Tractors & Riding Mowers, 1993 (5 pages).

*Primary Examiner*—Thomas B. Will
*Assistant Examiner*—Nathan Mammen
*Attorney, Agent, or Firm*—Mau & Krull, P.A.

[57] ABSTRACT

A grass catcher assembly 10 includes a hopper 15 has as inlet 16a for receiving a stream of air and grass clippings and an outlet 16b for venting air. A manifold 30 is operatively connected to the hopper 15. The manifold has an entrance for receiving the vented air and an exit for venting the air. The exit has a first orifice 33b and a second orifice 34b for venting air to the right and left side of the hopper. A baffle 40 selectively channels the vented air to the first or second orifices.

23 Claims, 6 Drawing Sheets

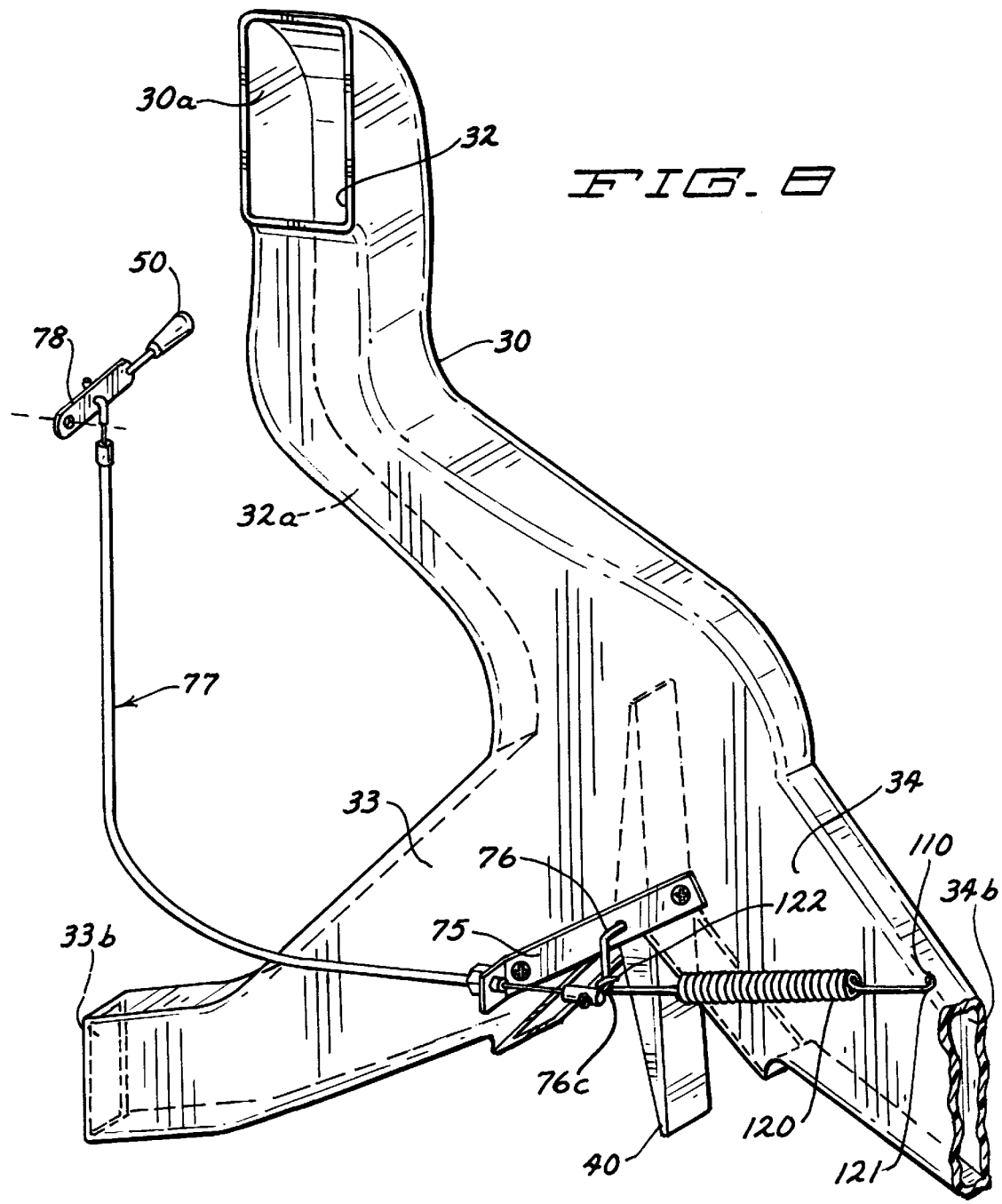

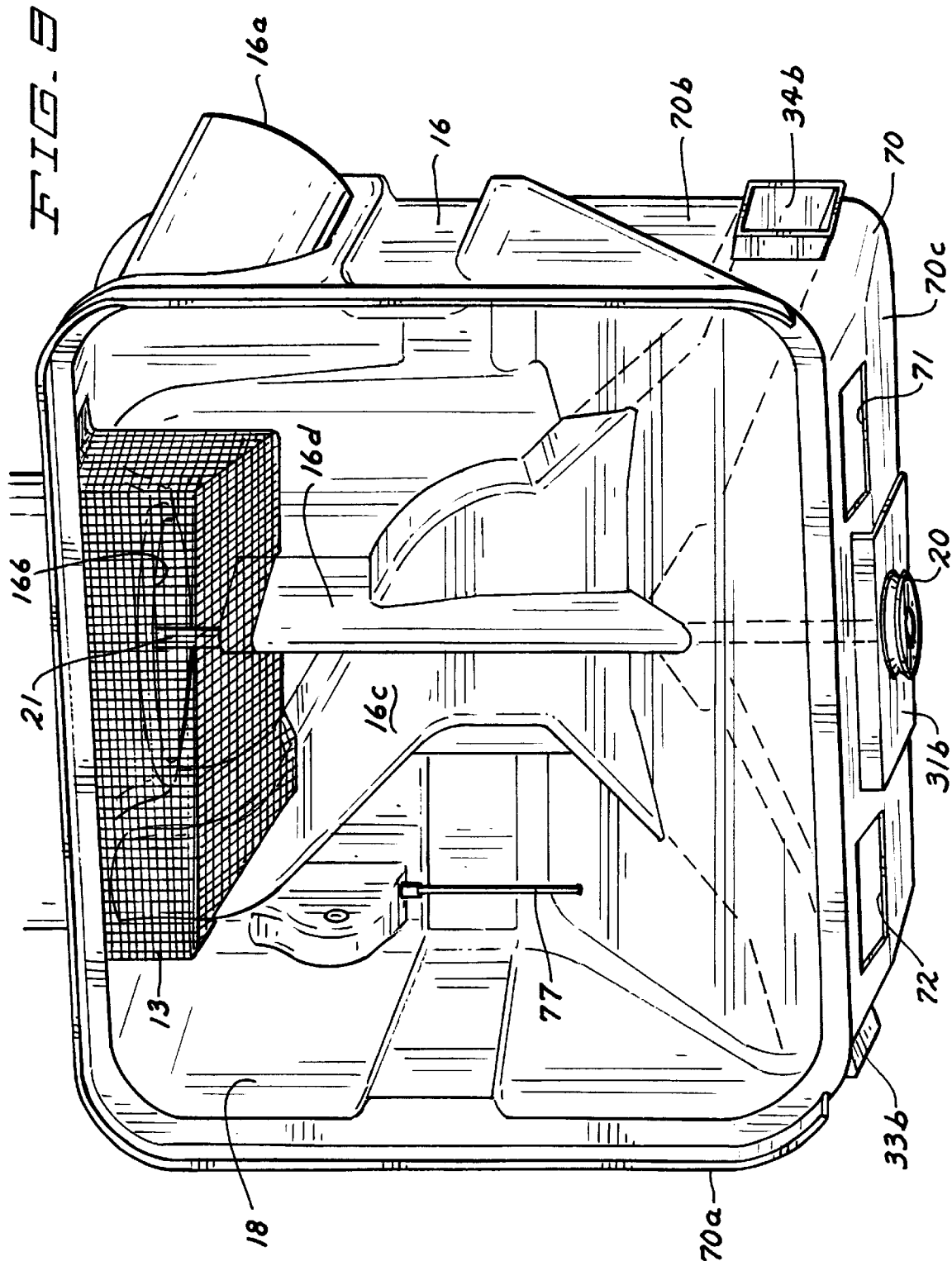

MULTI-PORT HOPPER EXHAUST APPARATUS

BACKGROUND OF THE INVENTION

1. Field of the Invention

This invention relates generally to grass clipping collectors carried by vehicles such as riding lawn mowers for collecting clippings cut by the mower, and more particularly to collectors for venting the air which has carried the clippings to the collector and selectively directing the direction of the vented air.

2. Description of the Prior Art

Although aspects of the present invention could conceivably be used on many types of grass catchers, the preferred catcher according to the invention is used in conjunction with riding rotary lawn mowers or lawn tractors. However, those skilled in the art will recognize that the invention could be applied to other types of mowers as well.

A lawn tractor includes a traction vehicle which carries a rotary grass-cutting unit. The cutting unit includes a deck beneath which is a rotatable blade powered by the the traction vehicle's prime motor. Attached to the mower deck is a discharge elbow which guides the grass clippings, leaves, debris, etc., into an upwardly inclined discharge tube. The end of the discharge tube is connected to a hopper where the grass clippings and air enter. The debris is then collected in the hopper and the air is exhausted. A filter or other device to prevent the grass clippings from exiting with the air is provided. An example of such a system is shown in U.S. Pat. No. 5,195,310. In this patent, the vented air is discharged towards the ground towards both sides of the collecting hopper.

The purpose of the discharge of the air is just to diffuse the air so as not to create a concentrated stream of air.

A typical grass catcher uses the rotary movement of the blade of the lawn mower wherein air currents are set up which causes entrainment of the produced clippings or debris into the turbulent body of air created by the movement of the blade. This entrained air is then conducted to the catcher where the grass and air are separated. In some embodiments, such as that disclosed in U.S. Pat. No. 4,095,398, a negative fluid pressure source, in the form of a vacuum pump or impeller, is arranged in fluid communication with the interior of the catcher. This negative pressure results in air from the catcher being vented, typically with more pressure, to outside of the grass catcher. In the purpose was to diffuse the vented air. No useful purpose for this vented air was recognized.

The present invention addresses the problems associated with the prior art grass catchers and provides for a grass catcher assembly which selectively channels the venting air to a first or second orifice. In addition, the vented air may be discharged through both orifices as well as a third orifice which is oriented, in a direction different than the first two orifices.

SUMMARY OF THE INVENTION

In one embodiment, the invention is a grass catcher assembly adapted for being operatively connected to a mower for generating a stream of air and grass clippings. The catcher assembly is adapted for receiving the stream of air and grass clippings and for venting the air. The grass catcher assembly includes a hopper having an inlet for receiving the stream of air and grass clippings and an outlet for venting the air. The hopper has right and left sides and a bottom. A manifold is operatively connected to the hopper. The manifold has an entrance for receiving the vented air and an exit for venting the air. The exit has first and second orifices. The first orifice is for venting air to the right side and the second orifice is for venting air to the left side. A baffle selectively channels the venting air to the first or second orifices.

In another embodiment, the invention is a grass catcher assembly adapted for being operatively connected to a mower for generating a stream of air and grass clippings. The catcher assembly is adapted for receiving the stream of air and grass clippings and for venting the air. The grass catcher assembly includes a hopper having an inlet for receiving the stream of air and grass clippings and an outlet for venting the air. The hopper has right and left sides and a bottom. An air duct is in fluid communication with the outlet and the air duct has an entrance for receiving the vented air from the outlet of the hopper. The air duct has a first passageway having a first end operatively connected to the entrance and a second end positioned for exhausting the vented air to the right side of the hopper. The air duct has a second passageway which has a first end operatively connected to the entrance and a second end positioned for exhausting the vented air to the left side of the hopper. An air flow selector mechanism selectively routes the vented air to the second end of the first passageway, the second end of the second passageway or to both of the second ends.

In another embodiment, the invention is a grass cutting catcher and bagger apparatus for lawn mowers having a housing equipped with a delivery duct leading from the housing for emitting a fluid stream of air and entrained air borne grass cuttings. The apparatus includes means for separating the air from the air-borne grass cuttings. The separating means has an inlet in fluid communication with the delivery duct and an outlet for venting the air. A first passageway has a first end in fluid communication with the outlet and a second end positioned for exhausting the vented air to the right side of the apparatus. A second passageway has a first end in fluid communication with the outlet and a second end positioned for exhausting the vented air to a left side of the apparatus. Also included is means for controlling the flow of vented air to the outlets.

BRIEF DESCRIPTION IF THE DRAWINGS

FIG. 8 is a perspective view of the manifold of the grass catcher shown in FIG. 1; and FIG. 9 is a perspective view showing the interior of the hopper.

DETAILED DESCRIPTION OF THE PREFERRED EMBODIMENT

Figure 1:
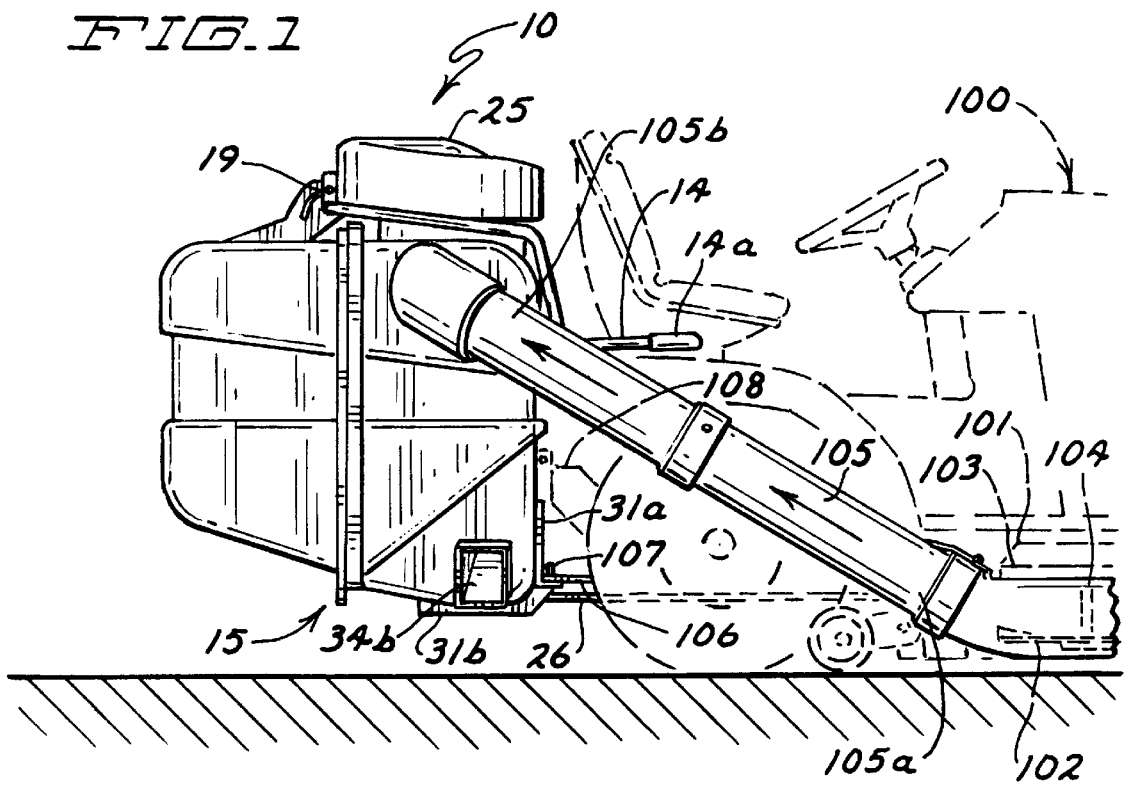
FIG. 1 is a side elevational view of the grass catcher constructed according to the principles of the present invention.
Figure 2:
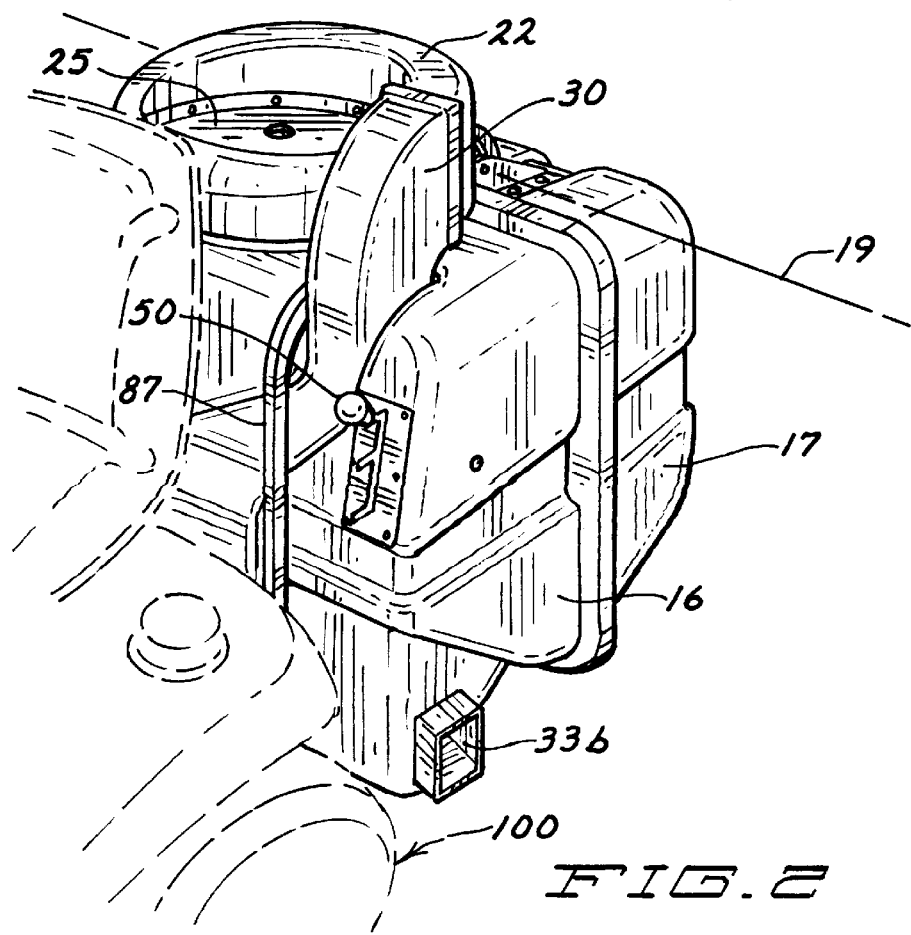
FIG. 2 is a perspective view generally shown from above and from the left side of the grass catcher assembly shown in FIG. 1.

Referring to the drawing, wherein like numerals represent like parts throughout the several views, there is generally disclosed at 10 a grass catcher assembly. In FIG. 1, the grass catcher assembly 10 is shown operatively connected to a lawn mower 100 shown in phantom. The lawn mower 100 includes a rotary grass cutting unit 101 that includes a blade 102 and deck 103. The deck 103 has a discharge elbow 104. Operatively connected, by any suitable means well known in the art, to the discharge elbow is a discharge tube 105. The first end 105a is operatively connected to the discharge elbow 104 and a second end 105b is operatively connected to the catcher assembly 10, as will be more fully described hereafter.

The lawn mower 100 has a hitch 106 which is mounted to the frame of the lawn mower 100. The hitch 106 has a mounting pin 107. Also connected to the frame of the lawn mower 100 is a mounting bracket 108.

Figure 3:
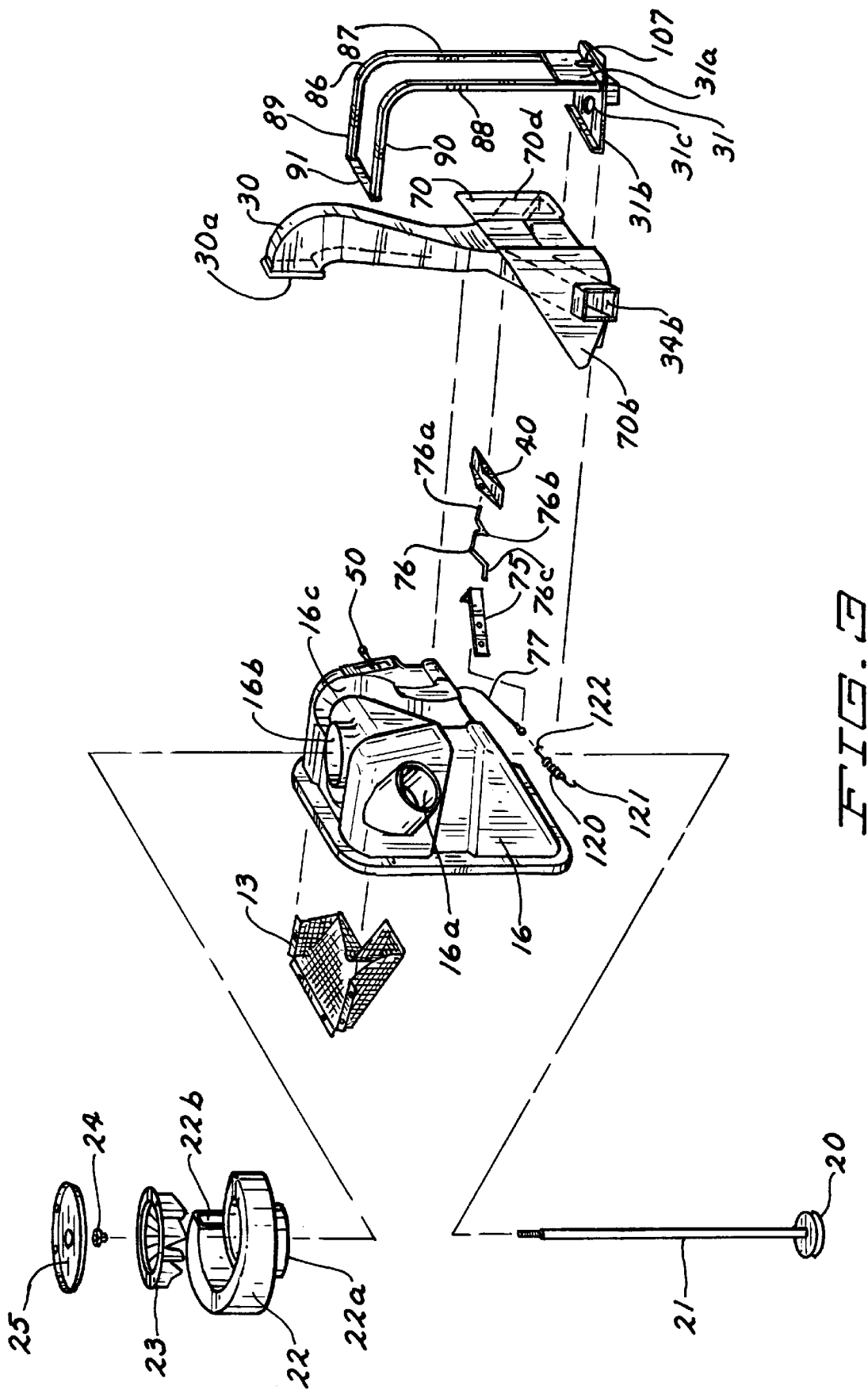
FIG. 3 is an exploded perspective view of a portion of the grass catcher shown in FIG. 1.
Figure 4:
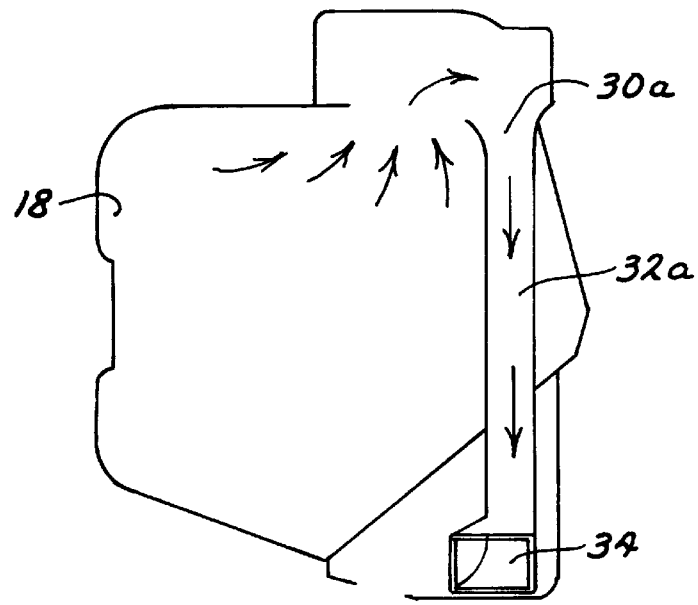
FIG. 4 is a schematic side elevational view showing the flow of air inside of the grass catcher shown in FIG. 1.

The grass catcher assembly 10 includes a hopper 15 having a front section 16 connected to a rear section 17. The front section 16 and rear section 17 form an inner cavity 18. The hopper 15 has an inlet 16a to which the second end 105b of the discharge tube 105 is connected. The inlet 16a is in fluid communication with the inner cavity 18. The hopper 15 also has an outlet 16b which also is in fluid communication with the inner cavity 18. The inner cavity 18 receives the stream of air and grass clippings generated by the lawn mower 100. The front section 16 is operatively connected to the rear section 17 by any suitable manner, well known in the art. As shown in FIG. 1, the top sections of the front section 16 and rear section 17 are hinged along line 19. A handle 14 is operatively connected to the rear section 17 at one end so that an operator may grasp the first end 14a and easily open the hopper 15 by pivoting the bottom edge of the rear section 17 away from the front section 16, thereby allowing the grass clippings to drop out of the inner cavity 18. A suitable latching means may be utilized at the bottom of the front section 16 and rear section 17 to latch the sections together. A screen 13 is secured across the outlet 16b so as to retain the grass clippings inside of the inner cavity 18 and to allow the air to be drawn out of the inner cavity 18 and later exhausted. The screen 13 is secured by suitable means across the outlet 16b. As can be seen in FIGS. 3 and 9, the screen encloses the area surrounding the outlet 16b. The forward portion of the front section 16 has an indentation 16c which is shaped similar to the configuration of the manifold 30 so that the manifold 30 will nest inside of the outer wall of the front section 16. A fan 23 is mounted on to the hopper 15. Any suitable fan may be utilized. Applicants have found one suitable fan has an impeller speed of 3600 RPM at 3300 RPM engine speed. It has a vacuum at its inlet of 8 inches of water and has a vacuum volume of 1150 cfm. As shown in FIG. 3, the fan 23 is mounted inside of a scroll 22 and a scroll cover 25 is placed on top to cover the fan. A fan drive shaft 21 is operatively connected to the fan 23 to rotate the fan 23. The drive shaft 21 has a pulley wheel 20 attached at its other end. The pulley wheel 20 is connected via a belt 26 to a suitable drive wheel from a power take-off (not shown) on the deck 101. A bearing 24 is mounted at one end of the drive shaft 21 proximate the fan 23. A second bearing (not shown) is proximate the pulley 20. The drive shaft 21 is outside of the inner cavity 18 and is thereby not contaminated by grass clippings and debris. Another indentation 16d is formed in the front surface of the front section 16. The indentation 16d forms a housing to keep the drive shaft 21 out of the inner cavity 18. Where the drive shaft 21 extends beyond the indentation 16d into the inner cavity 18, that portion is covered by the screen 13.

The scroll 22 has an inner passageway having a first end 22a in fluid communication with the screened outlet 16b. The second end 22b of the scroll passageway is an outlet which is in fluid communication with a manifold 30. The scroll 22 is positioned proximate the top of the hopper, so that vented air is removed from the top of the hopper and the heavier grass and debris collects at the bottom of the hopper. The manifold 30 is operatively connected to the hopper 15.

The manifold 30 is best seen in FIG. 8. In FIG. 3, the manifold 30 is shown in position in the manifold base support 70. The base support 70 includes a left side wall 70a, right side wall 70b, bottom 70c and front wall 70d all operatively connected to form the manifold base support 70. The base of the manifold 30 is positioned inside of the manifold base support 70, as best shown in FIGS. 3 and 8.

The manifold 30 has an inner passageway 32 having an upper section 32a which is in fluid communication with the inlet 30a. The passageway 32, at the end of upper section 32a branches off to a first branch passageway 33 and a second branch passageway 34. The first branch 33 is directed generally to the left of the hopper 15 and the second branch 34 is directed to the right of the hopper 15. Further, the exits 33b and 34b of passageways 33 and 34 are located generally proximate the ground level. In addition, the passageways, at their exits, are directed slightly downward so that the air exiting the outlets 33b and 34b are directed generally perpendicular to the line of travel of the lawn mower 100 and slightly downward, thereby directing the discharge at an angle best used for blowing leaves or debris.

In addition to having the upper section 32a branch off into branch passageways 33 and 34, an opening 35 is formed at the bottom of the manifold and it is approximately in the middle of the manifold. As best shown in FIG. 9, the bottom 70c of the manifold base support 70 has two openings 71 and 72. The openings 71 and 72 are underneath the opening 35. Any air that is blown through opening 35 of the manifold 30 will exit downwardly towards the ground through openings 71 and 72. The manifold base support has openings proximate the outlets 33b and 34b.

An air deflecting baffle 40 is mounted in the passageway 32. The baffle 40 is controlled by movement of the lever 50. The baffle 40 is positioned in the opening 35 and is positioned so that it may channel the vented air into either the left passageway 33, or the right passageway 34, or a combination of passageways 33, 34 and 35. A bracket 75 is mounted to the manifold 30. A pivot pin 76 is operatively connected to the baffle 40 at its first end. The first end 76a of pivot pin 76 extends through the bracket 75, a first side of the manifold 30, the baffle 40 and finally the other side of the manifold 30. The V-section 76b of the pivot pin 76 is flush against the baffle 40. At its second end 76c pivot pin 76 is attached to the cable 77. The other end of the cable 77 is connected to the lever 50 through bracket 78. A spring 120 has a first end 121 that is attached to a hole 110 in manifold 30. A second end 122 is secured around the pivot arm 76. The spring 120 provides tension for the operation of the baffle 40 between the three positions. Movement of the lever 50 will cause the baffle 40 to move between the three positions shown in FIGS. 5, 6 and 7. It is understood that other suitable means of moving the baffle 40 between these positions may also be utilized.

At the bottom of the base support 70 is secured a mounting bracket 31. The mounting bracket 31 has a vertical member 31a and a horizontal member 31b. The mounting bracket 31 is also used to mount the grass catcher assembly 10 to the lawn mower 100. The mounting bracket 31 has a hole through which pin 107 is inserted. Further, at the top of the vertical member 31a is connected a bracket 108 to further secure the grass catcher assembly 10 to the lawn mower 100. Any suitable means, well known in the art, may be used to connect the grass catcher 10 to the lawn mower 100. The horizontal member 31b has an opening 31c through which the drive shaft 21 is inserted, as shown in FIG. 9. A tubular support 86 is secured to the mounting bracket 31. The tubular support 86 has two vertical supports 87 and 88 operatively connected to two horizontal members 89 and 90. A cross piece 91 connects members 89 and 90. The tubular support 86 is further used to connect the manifold 30 to the hopper 15. The members 89 and 90 go on each side of the outlet 16b and the cross piece 91 is positioned behind the outlet 16b, thereby securing the manifold 30 to the hopper 15.

Figure 5:
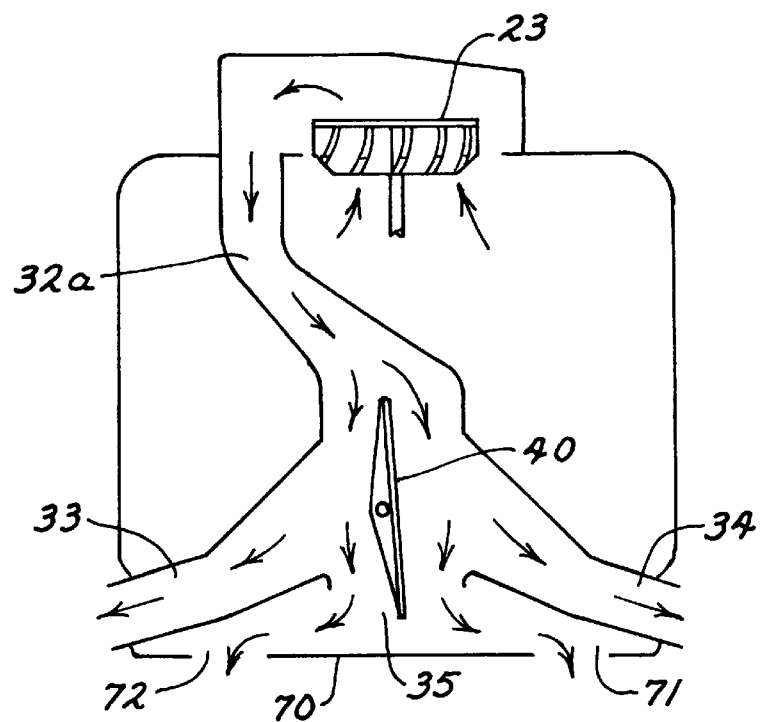
FIG. 5 is a rear schematic view showing the flow of air inside of the grass catcher shown in FIG. 1 with the baffles shown in a neutral position.

In operation, as the lawn mower 100 is operated, the blade 102 cuts grass and creates a draft which blows air and entrained grass clippings into the discharge tube 105 and into the inlet 16a of the hopper 15. The air and grass mixture is then inside of the inner cavity 18 where the grass clippings tend to settle to the bottom of the inner cavity 18. The rotation of the fan 23 creates a vacuum and draws the air through the screen 13 into the scroll 22. The vented air then exits the scroll 22 and enters the inlet 30a of the manifold 30. The vented air then continues to passageway 32 where it is selectively guided by the position of the baffle 40. As shown in FIG. 5, the baffle 40 is in a generally vertical position. In this position, air is vented out both the branch passageways 33 and 34 as well as the bottom opening 35. As shown in FIG. 5, the baffle 40 is inclined slightly to the left so as to equalize the distribution of air out of all three orifices.

Figure 6:
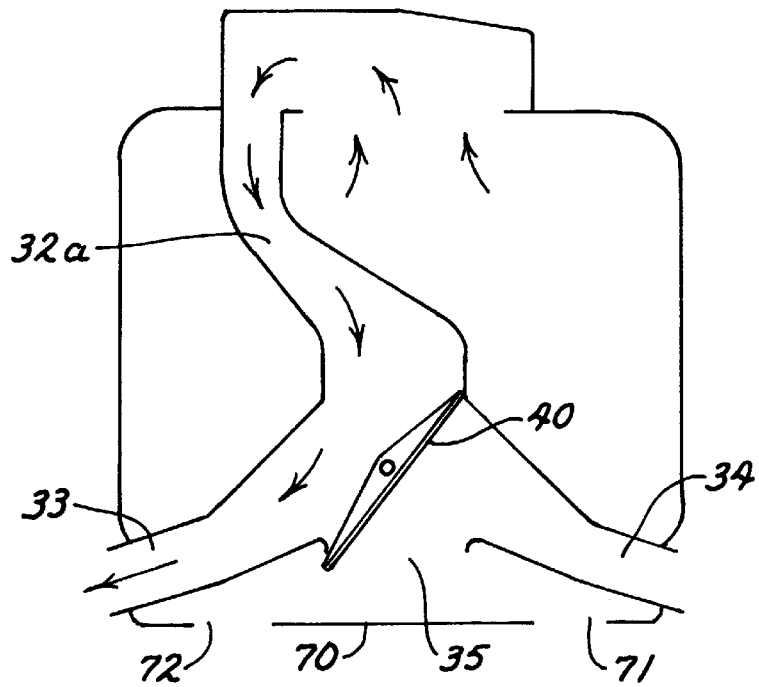
FIG. 6 is a rear schematic view showing the flow of air inside of the grass catcher shown in FIG. 1 with the baffles shown directing air to the left side.
Figure 7:
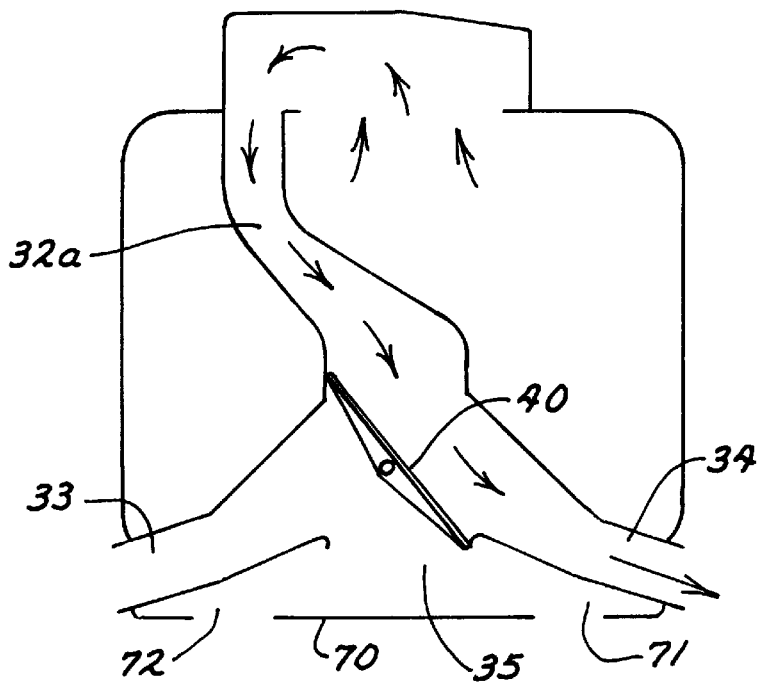
FIG. 7 is a rear schematic view showing the flow of air inside of the grass catcher shown in FIG. 1 with the baffles shown directing air to the right side.

As shown in FIG. 6, the baffle has been moved to the position which directs the air out the left branch passageway 33. The baffle 40 has one end which is proximate the end of the upper section 32a and the other end proximate the left side of the opening 35. This vents all of the air out of the left exit opening 33b. FIG. 7 shows the reverse where the baffle 40 closes off the left passageway 33 and opening 35 and directs the air out the right opening 34b.

When in the position shown in FIG. 5, the vented air is diffused out three openings. This is the mode the baffle is in when bagging the clippings. By distributing the vented air to three openings, the output at each opening is not as concentrated. When the baffle is moved to vent the air only to the right or left passageway, the velocity of the air being vented is increased, since the air is only going at one passageway, to where there is sufficient velocity and movement of air to act as a blower. The vented air may then be utilized by the operator of the lawn mower to blow grass clippings, debris or other matter such as leaves in either direction. The air exiting the right or left exit (as shown in FIGS. 6 and 7) is approximately 82 mph and has a volume of 800 cfm. Therefore, the lawn mower and grass catcher assembly 10 operate not only as a mower, but also as a powerful leaf blower or debris blower that may be operated selectively from either side of the unit.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A grass catcher assembly adapted for being operatively connected to a mower for generating a stream of air and grass clippings, the catcher assembly adapted for receiving the stream of air and grass clippings and for venting the air, the grass catcher assembly comprising:

a) a hopper having an inlet for receiving the stream of air and grass clippings and an outlet for venting the air, the hopper having right and left sides and a bottom;

b) a manifold operatively connected to the hopper, the manifold having an entrance for receiving the vented air and an exit for venting the air;

c) the exit having first and second orifices, the first orifice for venting air to the right side and the second orifice for venting air to the left side; and d) a baffle movable in a range of motion, wherein movement of the baffle towards a first position in the range of motion directs air towards the first orifice, and wherein movement of the baffle towards a second position in the range of motion directs air towards the second orifice.

2. The grass catcher of claim 1, further comprising:

a) the exit having a third orifice, the third orifice for directing air downward; and b) the baffle being movable in a range of motion, wherein positioning of the baffle at a third position in the range of motion directs a portion of the air to the third orifice.

3. The assembly of claim 1, further comprising a fan in fluid communication with the hopper outlet, whereby a vacuum is drawn in the hopper.

4. The assembly of claim 3, further comprising a scroll, the scroll having a passageway through which the vented air travels from the hopper to the manifold.

5. The assembly of claim 4, further comprising the hopper having a top and the scroll is positioned proximate the top of the hopper.

6. The assembly of claim 2, further comprising a manifold base support, the manifold positioned in the manifold base support.

7. The assembly of claim 6, wherein the manifold base support has a bottom member having an opening, the opening positioned proximate and underneath the third orifice.

8. A grass catcher assembly adapted for being operatively connected to a mower for generating a stream of air and grass clippings, the catcher assembly adapted for receiving the stream of air and grass clippings and for venting the air, the grass catcher assembly comprising:

(a) a hopper having an inlet for receiving the stream of air and grass clippings and an outlet for venting the air, the hopper having right and left sides and a bottom;

(b) an air duct in fluid communication with the outlet and the air duct having an entrance for receiving the vented air from the outlet of the hopper;

(c) the air duct having a first passageway having a first end operatively connected to the entrance and a second end positioned for exhausting the vented air to the right side of the hopper;

(d) the air duct having a second passageway having a first end operatively connected to the entrance and a second end positioned for exhausting the vented air to the left side of the hopper; and (e) an air flow selector mechanism for selectively routing the vented air to the second end of the first passageway, second end of the second passageway or to both of the second ends, wherein the assembly may perform as a blower to selectively channel the right side or left side.

9. The grass catcher of claim 8, further comprising:
(a) a third passageway having a first end operatively connected to the entrance and a second end positioned for exhausting the vented air downward; and
(b) the air flow selector mechanism selectively capable of routing at least a portion of the vented air at the second end of the third passageway.

10. The assembly of claim 8, further comprising a fan in fluid communication with the hopper outlet, whereby a vacuum is drawn in the hopper.

11. The assembly of claim 10, further comprising a scroll, the scroll having a passageway through which the vented air travels from the hopper to the manifold.

12. The assembly of claim 11, further comprising the hopper having a top and the scroll is positioned proximate the top of the hopper.

13. The assembly of claim 9, further comprising a manifold base support, the manifold positioned in the manifold base support.

14. The assembly of claim 13, wherein the manifold base support has a bottom member having an opening, the opening positioned proximate and underneath the second end of the third passageway.

15. A grass cutting catcher and bagger apparatus for lawn mowers having a housing equipped with a delivery duct leading from the housing for emitting a fluid stream of air and entrained air-borne grass cuttings, comprising:
a) means for separating the air from the air-borne grass cuttings, the separating means having an inlet in fluid communication with the delivery duct, the separating means having an outlet for venting the air;
b) first means for venting air to the right side of the apparatus, the first means having a first end in fluid communication with the outlet and a second end positioned for exhausting the vented air to a right side of the apparatus;
c) second means for venting air to the left side of the apparatus, the second means having a first end in fluid communication with the outlet and a second end positioned for exhausting the vented air to a left side of the apparatus; and
d) means for selectively controlling the flow of vented air to the first and second means.

16. The apparatus of claim 15, further comprising a third means for venting air downward, the third means having a first end in fluid communication with the outlet and a second end positioned for exhausting the vented air downward.

17. A grass catcher assembly adapted for being operatively connected to a mower for generating a stream of air and grass clippings, the catcher assembly adapted for receiving the stream of air and grass clippings and for venting the air, the grass catcher assembly comprising:
a) a hopper having an inlet for receiving the stream of air and grass clippings and an outlet for venting the air, the hopper having right and left sides and a bottom;
b) a manifold operatively connected to the hopper, the manifold having an entrance for receiving the vented air and an exit for venting the air;
c) the exit having first and second orifices, the first orifice for venting air to the right side and the second orifice for venting air to the left side; and
d) a means for selectively directing the venting air to the first or second orifices.

18. The grass catcher of claim 17, further comprising:
a) the exit having a third orifice, the third orifice for directing air downward; and
b) a means for selectively directing the venting air to the third orifice.

19. The assembly of claim 17, further comprising a fan in fluid communication with the hopper outlet, whereby a vacuum is drawn in the hopper.

20. The assembly of claim 19, further comprising a scroll, the scroll having a passageway through which the vented air travels from the hopper to the manifold.

21. The assembly of claim 20, further comprising the hopper having a top and the scroll is positioned proximate the top of the hopper.

22. The assembly of claim 18, further comprising a manifold base support, the manifold positioned in the manifold base support.

23. The assembly of claim 22, wherein the manifold base support has a bottom member having an opening, the opening positioned proximate and underneath the third orifice.

* * * * *